(12) United States Patent
Kaneko et al.

(10) Patent No.: US 6,434,475 B2
(45) Date of Patent: Aug. 13, 2002

(54) AUTOMATIC STOP/RESTART DEVICE OF VEHICLE ENGINE

(75) Inventors: Kakuzou Kaneko, Ebina; Taiichi Onoyama, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/789,013

(22) Filed: Feb. 21, 2001

(30) Foreign Application Priority Data

Feb. 21, 2000 (JP) ........................................ 2000-043371

(51) Int. Cl.$^7$ .............................. F02D 29/02; F02N 11/08
(52) U.S. Cl. ................... 701/112; 701/113; 123/179.4; 477/111; 477/205; 307/10.6; 290/38 E
(58) Field of Search ................................. 701/112, 113, 701/53, 54; 123/179.4; 477/111, 205; 307/10.6; 290/38 E

(56) References Cited

U.S. PATENT DOCUMENTS 6,275,759 B1 * 8/2001 Nakajima et al. ............. 701/54

FOREIGN PATENT DOCUMENTS

JP   8-61110   3/1996

\* cited by examiner

*Primary Examiner*—Andrew M. Dolinar
(74) *Attorney, Agent, or Firm*—Foley & Lardner

(57) ABSTRACT

In a vehicle which has an automatic stop/restart device of the engine 1, the engine 1 is started rapidly only in cases where a quick start of the engine 1 is required such as when the vehicle is stationary on a rising slope, or cuts across the opposite lane for a left turn. For this purpose, excitation of an motor 2 is performed before startup of the motor 2 for restarting the engine 1 quickly.

When automatic stop conditions are satisfied, the engine 1 stops, and when restart conditions are satisfied, the motor 2 is started to restart the engine 1. When the vehicle is on a rising slope and it is required to start the vehicle quickly, the motor 2 is energized first before the motor 2 is started. Also, when it is determined that the vehicle must start rapidly such as when the vehicle is trying to cut across the opposite lane for a left turn, the motor 2 is excited before it starts. In this way, when it is desired to start, the vehicle quickly, a rapid restart of the engine 1 and therefore rapid start of the vehicle is possible.

12 Claims, 4 Drawing Sheets

AUTOMATIC STOP/RESTART DEVICE OF VEHICLE ENGINE

FIELD OF THE INVENTION

This invention relates to a device for automatically stopping and restarting an engine.

BACKGROUND OF THE INVENTION

Tokkai Hei 8-61110 published by the Japanese Patent Office in 1996 discloses an engine automatic stop/restart device which does not perform an engine automatic stop control on a rising hill so that the vehicle does not move backwards.

SUMMARY OF THE INVENTION

However, in this type of engine automatic stop/restart device, when the vehicle is running a location where there are many ascending and descending slopes, there are few opportunities for automatically stopping the engine, so fuel consumption and exhaust gas cannot be suppressed. On the other hand, it may be possible to supply an exciting current constantly to a motor in order to restart the engine promptly whenever an automatic stop of the engine is performed. However, constant supply of the exciting current makes power consumption increase and fuel cost-performance deteriorate.

It is therefore an object of this invention to promptly restart an engine only when a vehicle has to start rapidly, such as when the vehicle has temporarily stopped on a rising hill, and thus to minimize loss of fuel cost-performance.

In order to achieve above object, this invention provides an engine automatic stop/restart device of a vehicle, the vehicle having a drive wheel, and a transmission mechanism which transmits a creep force to the drive wheel according to the rotation of an engine.

The automatic stop/restart device comprises a motor for starting the engine, an inverter for supplying an exciting current and a torque current to the motor, a sensor which detects that the vehicle is stationary, a sensor which detects that a brake pedal is depressed, a sensor which detects that an accelerator pedal is depressed, and a microprocessor.

The microprocessor programmed to stop the engine automatically when the vehicle is stationary with the brake pedal depressed, determine whether or not an excitation of the motor is required before startup of the motor, supply the exciting current to the motor before startup of the motor when the excitation of the motor is required before startup of the motor, inhibit supplying the exciting current to the motor before startup of the motor when the excitation of the motor is not required before startup of the motor, and restart the engine by supplying the torque current in addition to the exciting current to the motor for startup of the motor, when the accelerator pedal is depressed after the engine has automatically stopped.

The details as well as other features and advantages of this invention are set forth in the remainder of the specification and are shown in the accompanying drawings.

DESCRIPTION OF THE PREFERRED EMBODIMENTS

Figure 1:
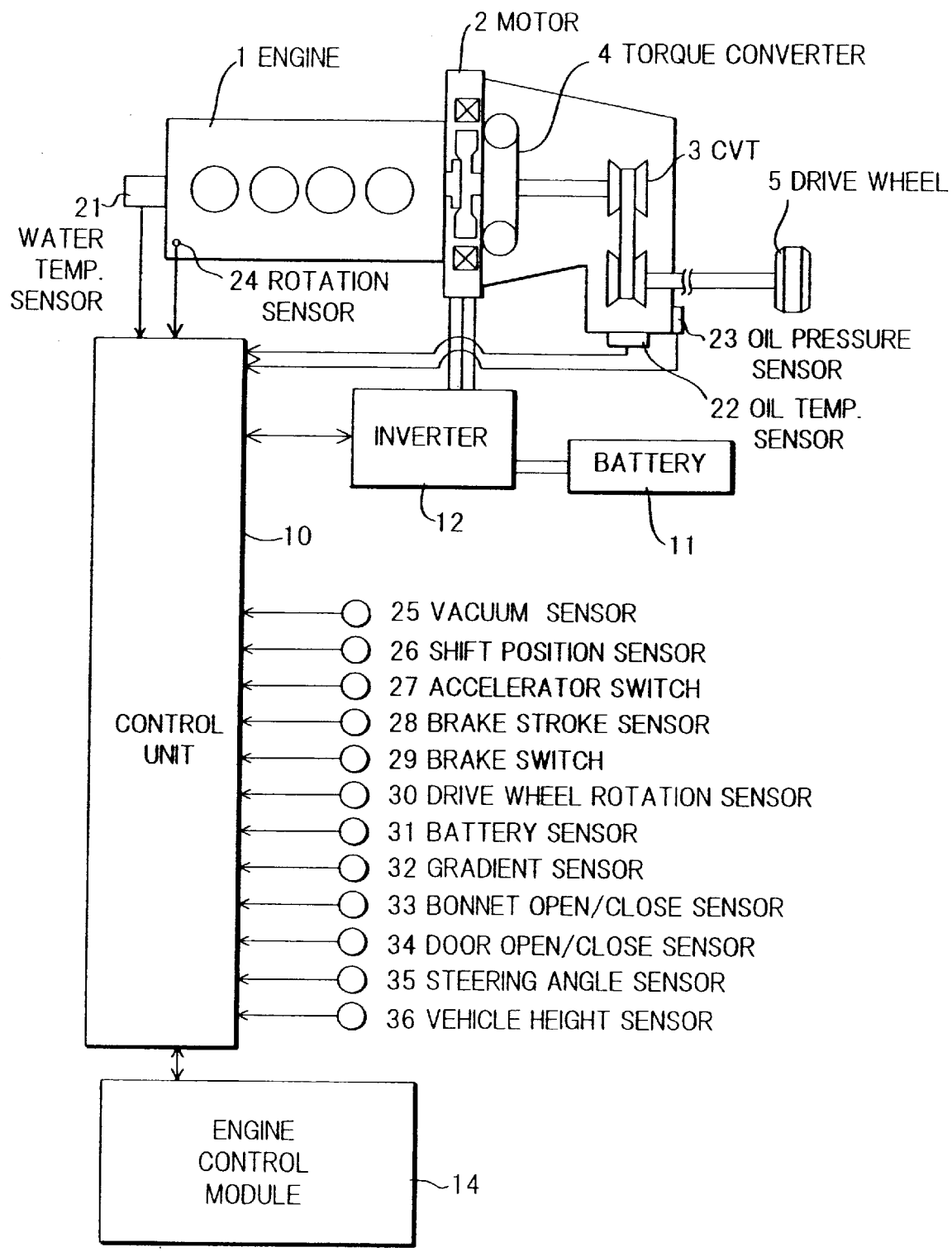
FIG. 1 is a schematic diagram of an engine automatic stop/restart device of a vehicle according to this invention.

Referring to FIG. 1 of the drawings, a vehicle drive system to which this invention is applied comprises an engine 1, an induction motor 2 which is connected with the engine 1, a continuously variable transmission (CVT) 3 and a torque converter 4. The engine 1 may be a gasoline engine or a diesel engine. The continuously variable transmission 3 is connected to the induction motor 2 via the torque converter 4. The rotation of an output shaft of the continuously variable transmission 3 is transmitted to drive wheels 5. Instead of the continuously variable transmission 3 a stepwise automatic transmission may be used. Forward motion and reverse motion of the vehicle is changed over by a forward/reverse change-over mechanism, not shown, interposed between the engine 1 and continuously variable transmission 3.

The induction motor 2 functions as a motor/generator. The induction motor 2 is connected to an output shaft of the engine 1 either directly, or connected via a gear and a chain. The induction motor 2 comprises a stator and a rotor. The induction motor 2 functions as a motor, starting the rotation of the engine 1, and also supplements the output of the engine 1 if necessary. Further, the induction motor 2 functions as a generator driven by the engine 1 and charges a battery 11 when the state of charge (SOC) of the battery 11 decreases. It also generates power by recovering energy when the vehicle is coasting and charges the battery 11.

The continuously variable transmission 3 comprises a pair of variable pulleys and a belt looped over these pulleys. By varying the diameters of these variable pulleys, the speed ratio of the rotating pulleys changes. The speed ratio is set to vary according to running conditions. The speed ratio is controlled by adjusting the pulley width, i.e., the groove width of the variable pulleys by oil pressure.

The control unit 10 comprises a microprocessor provided with a central processing unit (CPU), a read-only memory (ROM), a random access memory (RAM), and an input/output interface (I/O interface).

The control unit 10 controls the induction motor 2 via an inverter 12. When the induction motor 2 functions as a motor, the control unit 10 commands the inverter 12 to supply an exciting current and a torque current to the stator coils of the induction motor 2. If only the exciting current is supplied without the torque current, the induction motor 2 cannot rotate. When the induction motor 2 functions as a generator, the control unit 10 commands the inverter 12 to supply the exciting current to the induction motor 2, so as to generate power to charge the battery 11.

When predetermined automatic stop conditions are satisfied, the control unit 10 stops the engine 1 by commanding an engine control module 14. For example, when the vehicle temporarily stops at a crossing while it is traveling, these predetermined automatic stop conditions are satisfied. The automatic stopping of the engine while the vehicle is traveling is referred to as an idling stop. When the predetermined automatic restart conditions are satisfied, the control unit 10 drives the induction motor 2 to automatically restart the engine 1. The restart conditions are satisfied when, for example, the accelerator pedal is depressed or the battery SOC drops.

To perform this control, various signals are input from sensors to the control unit 10. They are a water temperature sensor 21 which detects an engine cooling water temperature, an oil temperature sensor 22 which detects an oil temperature of the continuously variable transmission 3, an oil pressure sensor 23 which detects an oil pressure of the continuously variable transmission 3, a rotation sensor 24 which detects a rotation speed of the engine 1, a vacuum sensor 25 which detects a negative pressure of a brake booster, a shift position sensor 26 which detects a position of a shift lever, an accelerator switch 27 which detects that an accelerator pedal is depressed, a brake stroke sensor 28 which detects a brake pedal depression amount, a brake switch 29 which detects that a brake pedal is depressed, a drive wheel rotation sensor 30 which detects a rotation of the drive wheels 5, a battery sensor 31 which detects the state of charge (SOC) of the battery 11, a gradient sensor 32 which detects whether or not the vehicle is traveling on a rising hill, a bonnet open/close sensor 33 which detects whether a bonnet of the vehicle is open or closed, a door open/close sensor 34 which detects whether or not doors of the vehicle are all closed, a steering angle sensor 35 which detects a steering angle of a steering wheel, and a vehicle height sensor 36 which detects a position in the vertical direction of a rear wheel axle.

Figure 2:
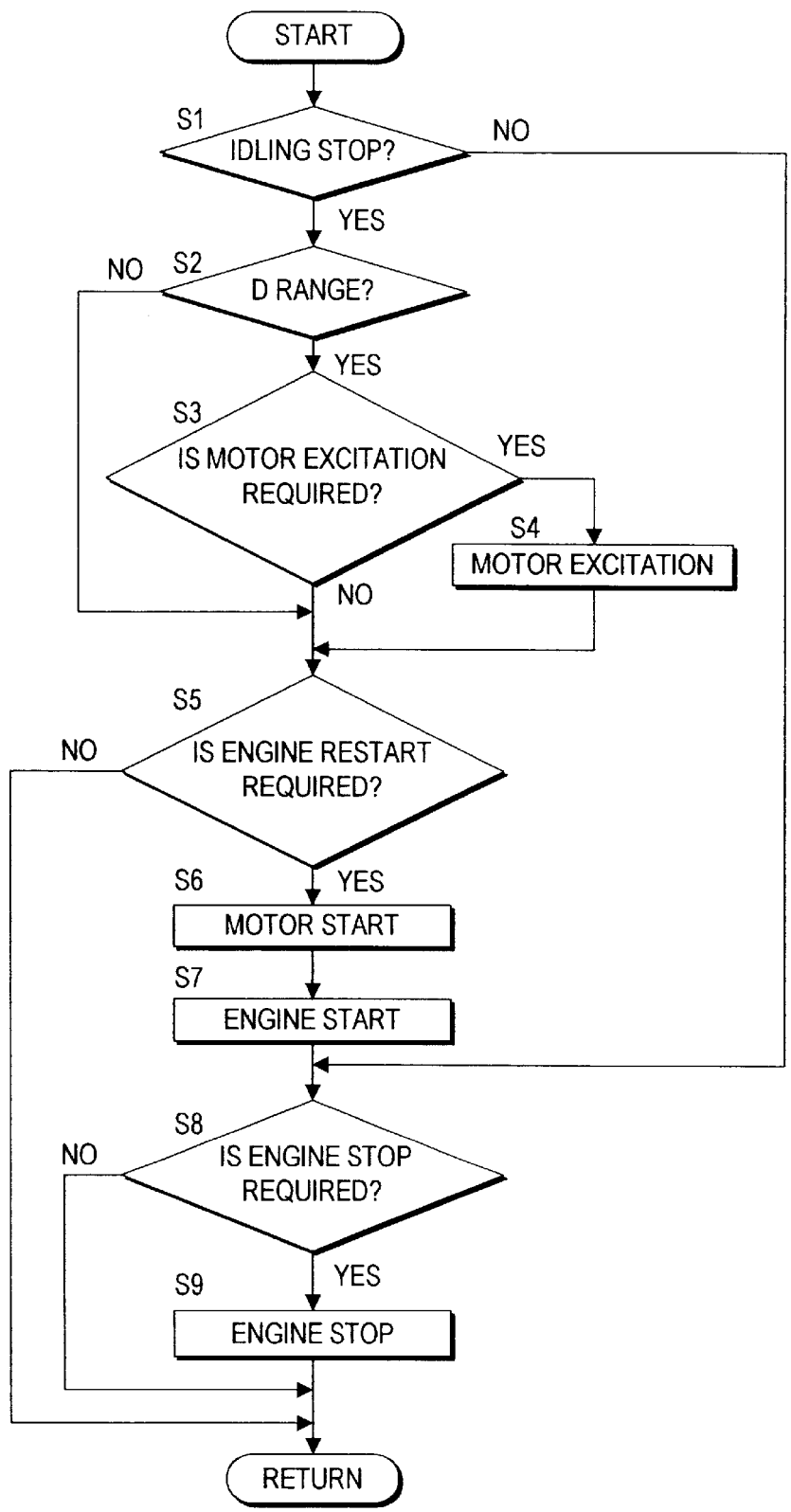
FIG. 2 is a flowchart describing an engine stop/restart control routine performed by a control unit according to this invention.

Referring to the flowchart of FIG. 2, the engine automatic stop and restart control performed by the control unit 10 will now be described.

In a step S1, it is determined whether or not the engine 1 has automatically stopped using signals from the bonnet open/close sensor 29, the door open/close sensor 34, the rotation sensor 24 and the drive wheel rotation sensor 30. If the following conditions are all satisfied, it is determined that the engine 1 has automatically stopped, i.e., that an idling stop is being performed.

(1) The engine rotation speed is 0.
(2) The vehicle speed i.e., the rotation speed of the drive wheels, is 0.
(3) The vehicle doors are all closed.
(4) The vehicle bonnet is closed.

When the engine 1 is performing an automatic stop, the routine proceeds to a step S2. In the step S2, it is determined whether or not the transmission is in the drive range (D range) by a signal from the shift position sensor 26.

When the transmission is in the drive range, the routine proceeds to a step S3.

In the step S3, it is determined whether or not the excitation of the induction motor 2 is required. The induction motor 2 is necessary to be excited before its startup when it is required to restart the engine 1 quickly. A quick restart of the engine 1 is required to start the vehicle rapidly when the vehicle stops midway on a rising slope, when the vehicle cuts across the opposite lane for making a left turn at a crossing, when the vehicle is carrying a large load and the acceleration is poor, or when the driver releases the brake pedal rapidly to start the vehicle promptly.

Specifically, it is determined that the excitation of the induction motor 2 is required when any of the following conditions are satisfied.

(1) The slope of a rising hill detected by the gradient sensor 32 is greater than a predetermined slope.
(2) The steering angle of the steering wheel detected by the steering angle sensor 35 is greater than a predetermined steering angle.
(3) The vehicle height detected by the vehicle height sensor 36 is less than a predetermined height.
(4) The release speed of the brake pedal calculated from the output of the brake stroke sensor 28 is greater than a predetermined speed.

For example, the predetermined slope is set in the range of 5% to 10%, the predetermined steering angle is set to about 30% of the maximum steering angle, and the predetermined speed is set to about 333 mm/sec. It is determined that the vehicle is on a rising hill, when the slope of the rising hill is greater than a predetermined slope. The predetermined height largely depends on the type of the vehicle. For example, in the case of a passenger vehicle, it is set to the vehicle height when the vehicle is carrying the load corresponding to the 80% weight of the full seating capacity, taking a weight of a person to be 55 kg.

When there is a request for the excitation in the step S3, the routine proceeds to the step S4. In the step S4, the control unit 10 commands the inverter 12 to supply the excitation current to the induction motor 2. When the torque current is supplied to the induction motor 2 excited beforehand, the torque will increase instantly. Therefore, in the case where the induction motor 2 is excited before starting, the engine 1 will start quickly when an engine restart is performed. In the step S4, an excitation current is supplied, but as a torque current is not supplied, the induction motor 2 does not rotate.

Following the step S4, the routine proceeds to a step S5. When the transmission is not in the drive range in the step S2, the routine proceeds to the step S5, determining that it is not required to start the vehicle rapidly. And also when the excitation is not required in the step S3, the routine proceeds to the step S5.

In the step S5, it is determined whether or not the engine restart conditions hold, i.e., whether or not a restart is required.

It is determined that a restart of engine 1 is required when at least one of the following conditions is satisfied.

(1) The accelerator pedal is depressed. (The accelerator switch is ON.)
(2) The brake pedal is completely released. (The brake switch is OFF).
(3) The battery SOC is less than a predetermined SOC.
(4) The brake booster negative pressure is less than a predetermined negative pressure.
(5) The engine cooling water temperature is less than a predetermined water temperature.
(6) The transmission oil temperature is less than a predetermined oil temperature.
(7) The transmission oil pressure is less than a predetermined oil pressure.

For example, the predetermined SOC is set in the range of 30% to 40% of the full charge, the predetermined negative pressure is set to about 190 mmHg, the predetermined water temperature is set to about 25° C., the predetermined oil temperature is set to about 25° C., and the predetermined oil pressure is set to about 0.7 MPa. Here, a "negative pressure" means a pressure difference relative to the atmospheric pressure. If a negative pressure is small, an absolute pressure is large. The predetermined negative pressure depends largely on the capacity of the negative pressure tank of the brake booster.

The engine restarts in the following two cases. Firstly, the driver intentionally restarts the engine. This is the case that the driver releases the brake pedal, and depresses the accelerator pedal. The other case is where the engine restarts due to a command from the control unit 10 despite the fact that the driver has not intended to start the vehicle. This occurs, for example, when the induction motor 2 generates power due to the fact that the battery SOC has fallen below the predetermined SOC.

When the restart of the engine 1 is not required, the routine is terminated.

If the restart of the engine 1 is required, the routine proceeds to a step S6. In the step S6, the control unit 10 commands the inverter 12 to supply the torque current to the induction motor 2 in addition to the exciting current in order to startup of the induction motor 2. When the excitation current is supplied beforehand in the step S4, the induction motor 2 increases its speed instantaneously due to the supply of the torque current. In this way, as a large creep force is produced instantaneously, the vehicle can start rapidly without reversing even on a rising slope.

On the other hand, when the excitation is not performed beforehand, the rise of rotation speed is somewhat delayed. When the excitation is not performed in the step S4, both the exciting current and the torque current are first supplied to the induction motor 2 in the step S6 to startup the induction motor 2. In this case, the rise of the rotation speed of the engine is delayed compared to the case where the induction motor 2 is excited in the step S4.

Due to the rotation of the induction motor 2, a creep force is transmitted from the torque converter 4 to the drive wheels via the continuously variable transmission 3, and the engine 1 also rotates. The creep force of the torque converter 4 is effectively proportional to the square of the increase of rotation speed.

Next, the engine 1 is commanded to start in a step S7. In the case of a gasoline engine, the startup of the engine 1 is performed by fuel injection to the engine, and ignition by a spark plug. Injection may start before ignition so that the ignition proceeds smoothly.

After the startup of the engine 1 is performed, in a step S8, it is determined whether or not engine stop is required. When the engine 1 does not stop automatically in the step Si, i.e., when an idling stop is not performed, the routine proceeds to the step S8 directly.

For example, when the vehicle temporarily stops at a crossing while it is traveling, the predetermined automatic stop conditions are satisfied, and the engine 1 stops automatically.

When the following conditions are all satisfied, it is determined that the automatic stop of the engine 1 is required.

(1) The vehicle speed is 0.
(2) The brake pedal is depressed. (The brake switch is ON).
(3) The vehicle doors are all closed.
(4) The vehicle bonnet is closed.
(5) The battery SOC is equal to or greater than the predetermined SOC.
(6) The brake booster negative pressure is equal to or greater than the predetermined negative pressure.
(7) The engine cooling water temperature is equal to or greater than the predetermined water temperature.
(8) The transmission oil temperature is equal to or greater than the predetermined oil temperature.
(9) The transmission oil pressure is equal to or greater than the predetermined oil pressure.

When the automatic stop is not required, the vehicle shifts to a start operation. When an automatic stop has been required, the routine proceeds to a step S9, and the control unit 10 stops the engine 1 via the engine control module 14, i.e., the idling stop is performed. In the case where the induction motor 2 has been excited to generate power to charge the battery 11 during the coasting of the vehicle, the excitation stops before the stopping of the engine 1.

Subsequently, the aforesaid routine is repeated at a predetermined interval, for example 10 msec by a timer interrupt.

Next, the advantages of this invention will be described.

When the conditions hold for restarting the engine in the step S5, in the step S6, the induction motor 2 to start the engine 1 rotates due to supply of the exciting current and the torque current. In the step S7, a large creep force is produced due to startup of the engine 1.

Figure 3:
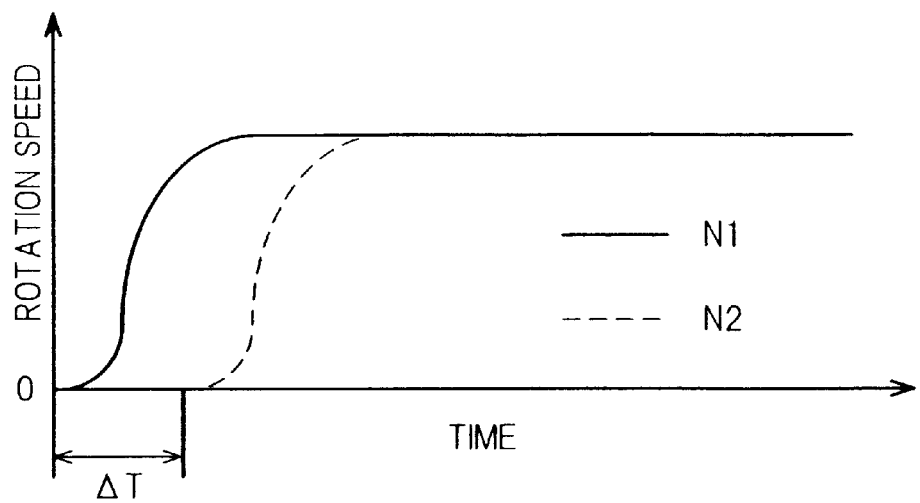
FIG. 3 is a diagram showing rotation speed increase characteristics of an engine on restarting, when a motor is excited before its startup and when the motor is not excited before its startup.

Referring to FIG. 3, the engine rotation speed increase characteristics will be described. In FIG. 3, the increase characteristics of the engine rotation speed when the induction motor 2 is excited before startup of the induction motor 2 (N1) and the engine rotation speed when the induction motor 2 is not excited before startup of the induction motor 2 (N2), are shown by the solid line and dotted line, respectively.

The way the engine rotation speed rises depends on whether or not the induction motor 2 is excited before its startup. As shown by the dotted line, the rise of the engine rotation speed is delayed without prior excitation of the motor. It takes a period of time $\Delta T$ of about 0.1 sec to 0.2 sec to complete the excitation of the induction motor 2. Subsequently, the engine begins to rotate together with the rotation of the induction motor 2. On the other hand, as shown by the solid line, the engine rotation speed rises rapidly when the excitation is performed beforehand.

When the vehicle starts on a rising slope, there is a possibility that the vehicle will reverse when the brake is released, due to the delay in the production of creep force resulting from the delay in the appearance of the torque in the induction motor 2.

However, according to this invention, when the engine restarts on a rising slope, the excitation of the induction motor 2 has been performed beforehand, so the induction motor 2 rotates instantly. Therefore, the engine rotation and the creep force produced by it increase instantaneously. As a result, the vehicle starts smoothly without reversing on a rising slope.

Figure 4:
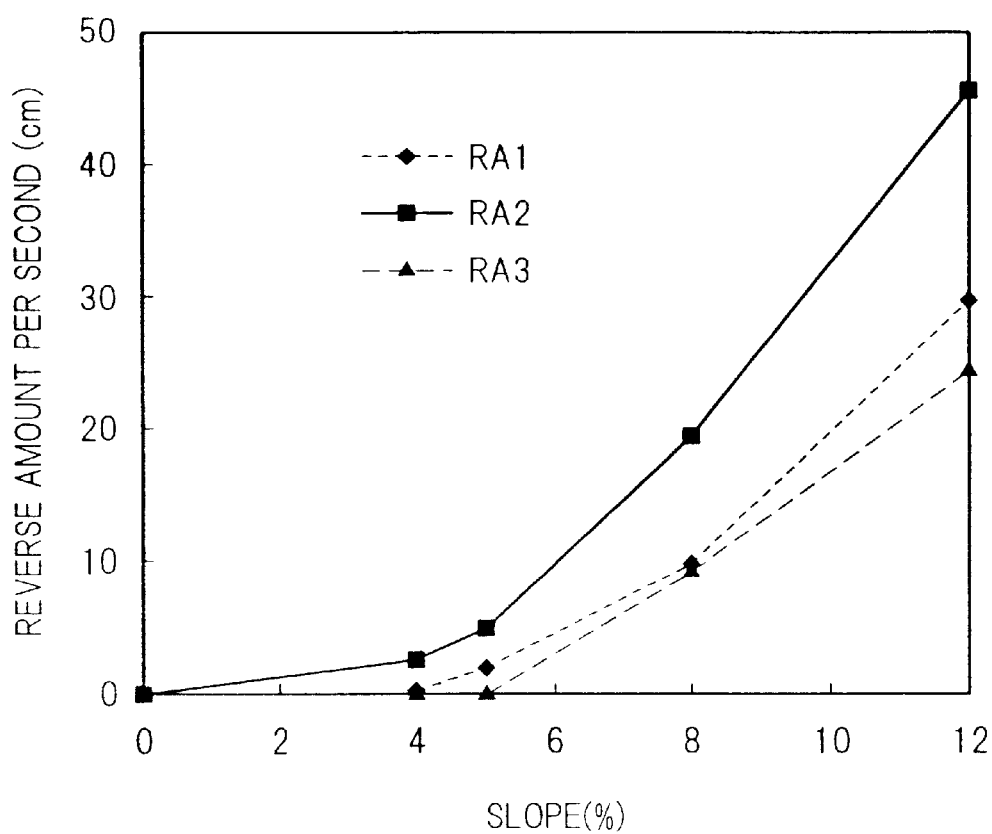
FIG. 4 is a diagram showing a vehicle reverse amount per second relative to a road surface slope when a motor is excited before its startup and when the motor is not excited before its startup.

FIG. 4 shows the reverse amount of the vehicle in unit time after the brake is released relative to the slope, according to experimental results. In FIG. 4, the reverse amount when the induction motor 2 is excited before its startup (RA1), the reverse amount when the induction motor 2 is not excited before its startup (RA2), and the reverse amount when a creep force is constantly generated (RA3) even during the stoppage of the vehicle, are shown. When the excitation is not performed beforehand, the reverse amount increases, i.e., RA2 is larger than RA1. When the induction motor 2 is excited before starting, the reverse amount is as small as when a creep force is constantly generated during stoppage in a vehicle which does not have an engine automatic stop/restart device.

The excitation of the induction motor 2 is performed to start the engine rapidly not only when the vehicle is on a rising slope, but also when a rapid start is required on a flat road. For example, a rapid start of the vehicle is required when vehicle acceleration is poor due to heavy loads, or when the vehicle cuts across the opposite lane for making a left turn. It is determined whether or not the vehicle height is less than a predetermined height due to carrying loads, by detecting the vertical position of the rear wheel axle using the vehicle height sensor 36.

When the vehicle height is less than a predetermined height during a temporary stoppage of the vehicle, the induction motor 2 is excited prior to its startup. When the steering angle is greater than a predetermined steering angle, it is determined that the vehicle is attempting make a left turn at a crossing. During a temporary stoppage of the vehicle before the vehicle cuts across the opposite lane for a left turn, the induction motor 2 is excited before its startup.

Furthermore, the excitation is performed immediately when the driver needs to start quickly, and the brake pedal is released suddenly. From the release speed of the brake pedal, it is determined whether or not a quick start is required.

When the brake pedal depression amount decreases by for example 10 mm or more in 30 msec, the excitation is performed immediately. In other words, when the release speed of the brake pedal is greater than a predetermined speed, i.e., 333 mm/sec, the excitation is performed immediately.

Figure 5:
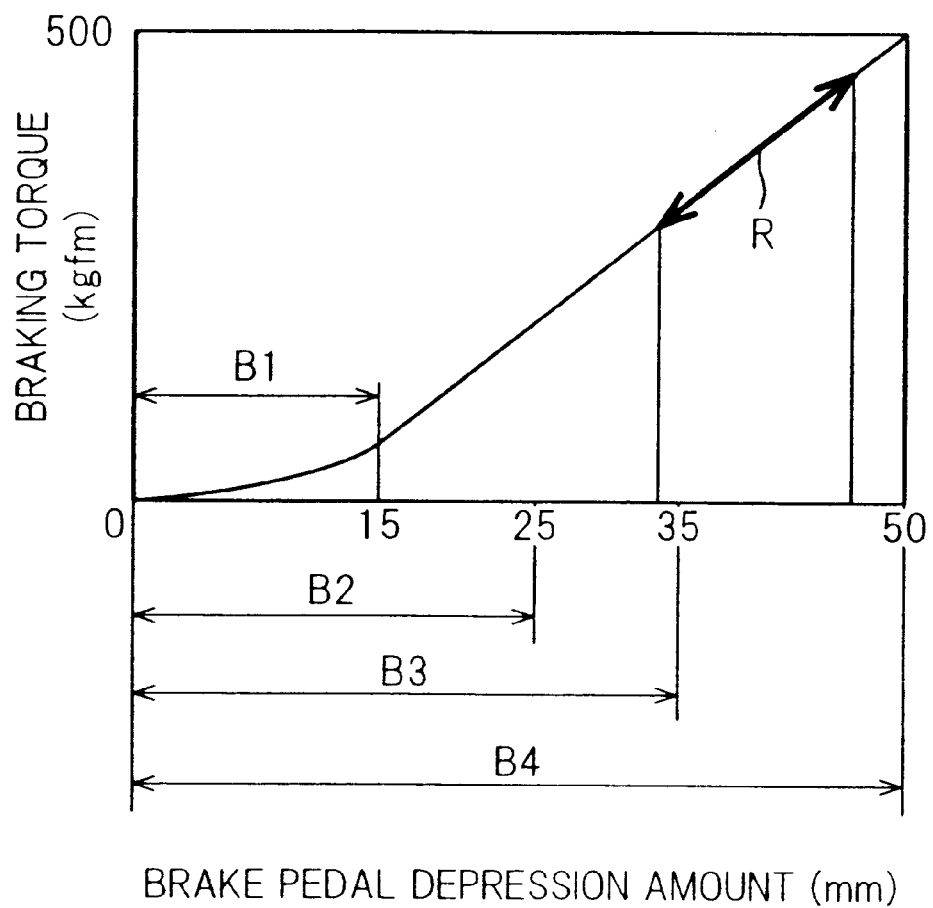
FIG. 5 is a diagram showing the relation between a brake stroke amount and braking torque.

FIG. 5 shows the relation between brake pedal depression amount and the braking torque obtained from experiment. Referring to FIG. 5, an ordinary brake stroke amount when the vehicle is stationary is almost distributed between the brake stroke amount when the engine stops automatically (B3), and a full stroke amount (B4). Accordingly, the braking torque during a stoppage of the vehicle is usually larger than the braking torque when the engine begins the automatic stop, and less than the braking torque during a full stroke, as denoted by R in FIG. 3.

In an ordinary engine automatic stop/restart device, when a brake OFF signal is detected by the brake switch 29 at a brake pedal depression amount B1, for example 15 mm, the excitation of the induction motor 2 takes place for starting the induction motor 2. According to this invention, by measuring the time for which the brake pedal is displaced from the position B3 to the position B2 above B1 the release speed of the brake pedal is measured. For example, B3 is set to 35 mm, and B2 is set to 25 mm.

When this speed is more than the predetermined speed, the excitation is started promptly. On the other hand, when the measured release speed of the brake pedal is less than the predetermined speed, the excitation is started at the brake stroke position where the brake OFF signal is detected, e.g. 15 mm, as usual.

As the time required for excitation of the induction motor 2, ΔT, is 0.1 sec to 0.2 sec, by performing the excitation immediately when a sudden release of the brake pedal is detected in this way, the torque of the induction motor 2 is generated earlier than when the excitation is performed when the brake pedal is OFF.

When a rapid start of the vehicle is required, by exciting the induction motor 2 before startup of the motor, a large creep force is generated in the instant when the engine restarts so that the vehicle can start promptly.

The excitation of the induction motor 2 prior to startup is not performed during all idling stops, but is limited to special cases such as when the vehicle stops on a rising slope, or when a rapid start of the vehicle is required. As a result, the power consumption required for excitation is suppressed to the minimum, and the impairment of fuel cost-performance is correspondingly suppressed.

The entire contents of Japanese Patent Applications P2000-43371 (filed Feb. 21, 2000) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. An engine automatic stop/restart device of a vehicle, the vehicle having a drive wheel, and a transmission mechanism which transmits a creep force to the drive wheel according to a rotation of an engine, comprising;
   a motor for starting the engine,
   an inverter for supplying an exciting current and a torque current to the motor,
   a sensor which detects that the vehicle is stationary,
   a sensor which detects that a brake pedal is depressed,
   a sensor which detects that an accelerator pedal is depressed, and
   a microprocessor programmed to:
      stop the engine automatically when the vehicle is stationary with the brake pedal depressed,
      determine whether or not an excitation of the motor is required before startup of the motor,
      supply the exciting current to the motor before startup of the motor when the excitation of the motor is required before startup of the motor,
      inhibit supplying the exciting current to the motor before startup of the motor when the excitation of the motor is not required before startup of the motor, and
      restart the engine by supplying the torque current in addition to the exciting current to the motor for startup of the motor, when the accelerator pedal is depressed after the engine has automatically stopped.

2. The engine automatic stop/restart device as defined in claim 1, further comprising a shift position sensor which detects if the transmission mechanism is in a drive range wherein the creep force is transmitted to the drive wheel, and a sensor which detects the slope of the vehicle, wherein
   the microprocessor is further programmed to determine that the excitation of the motor is required before startup of the motor when the transmission mechanism is in the drive range, and the vehicle is on a rising slope greater than a predetermined slope.

3. The engine automatic stop/restart device as defined in claim 1, further comprising a shift position sensor which detects if the transmission mechanism is in a drive range wherein the creep force is transmitted to the drive wheel, and a sensor which detects a vehicle height, wherein
   the microprocessor is further programmed to determine that the excitation of the motor is required before startup of the motor when the transmission mechanism is in the drive range, and the vehicle height is less than a predetermined height.

4. The engine automatic stop/restart device as defined in claim 1, further comprising a shift position sensor which detects if the transmission mechanism is in a drive range wherein the creep force is transmitted to the drive wheel, and a sensor which detects a steering angle of a steering wheel, wherein
   the microprocessor is further programmed to determine that the excitation of the motor is required before startup of the motor when the transmission mechanism is in the drive range, and the steering angle of the steering wheel is greater than a predetermined steering angle.

5. The engine automatic stop/restart device as defined in claim 1, further comprising a shift position sensor which detects if the transmission mechanism is in a drive range wherein the creep force is transmitted to the drive wheel, and a sensor which detects a brake pedal depression amount, wherein the microprocessor is further programmed to determine that the excitation of the motor is required before startup of the motor when the transmission mechanism is in the drive range, and the decrease speed of the brake pedal depression amount is greater than a predetermined speed.

6. The engine automatic stop/restart device as defined in claim 1, wherein the microprocessor is further programmed to restart the engine, when the brake pedal is not depressed after the engine has automatically stopped.

7. The engine automatic stop/restart device as defined in claim 1, wherein the restart device further comprises a battery sensor which detects a state of charge (SOC) of a battery, and the microprocessor is further programmed to restart the engine, when the battery SOC is less than a predetermined SOC after the engine has automatically stopped.

8. The engine automatic stop/restart device as defined in claim 1, wherein the restart device further comprises a sensor which detects a negative pressure of a brake booster with which the brake is provided, and the microprocessor is further programmed to restart the engine, when the negative pressure of the brake booster is less than a predetermined negative pressure after the engine has automatically stopped.

9. The engine automatic stop/restart device as defined in claim 1, wherein the restart device further comprises a sensor which detects an engine cooling water temperature of the engine, and the microprocessor is further programmed to restart the engine, when the engine cooling water temperature is less than a predetermined water temperature after the engine has automatically stopped.

10. The engine automatic stop/restart device as defined in claim 1, wherein the restart device further comprises a sensor which detects an oil temperature of a transmission with which the transmission mechanism is provided, and the microprocessor is further programmed to restart the engine, when the oil temperature of the transmission is less than a predetermined oil temperature after the engine has automatically stopped.

11. The engine automatic stop/restart device as defined in claim 1, wherein the restart device further comprises a sensor which detects an oil pressure of a transmission with which the transmission mechanism is provided, and the microprocessor is further programmed to restart the engine, when the oil pressure of the transmission is less than a predetermined oil pressure after the engine has automatically stopped.

12. An engine automatic stop/restart device of a vehicle, the vehicle having a motor, a drive wheel, and a transmission mechanism which transmits a creep force to the drive wheel according to a rotation of an engine, comprising;

means for detecting a stoppage of the vehicle, means for detecting a depression of a brake pedal, means for detecting a depression of an accelerator pedal, means for stopping the engine automatically when the vehicle is stationary with the brake pedal depressed, means for determining whether or not an excitation of the motor is required before startup of the motor, means for supplying the exciting current to the motor before startup of the motor when the excitation of the motor is required before startup of the motor, means for inhibiting the supply of the exciting current to the motor before startup of the motor when the excitation of the motor is not required before startup of the motor, and means for supplying a torque current in addition to the exciting current to the motor for startup of the motor, when the accelerator pedal is depressed after the engine has automatically stopped.

* * * * *